(12) United States Patent
Hammond (10) Patent No.: US 12,414,580 B1
(45) Date of Patent: *Sep. 16, 2025

(54) FILTRATION METHOD FOR PRODUCING VALUE ADDED PRODUCTS FROM RICE BRAN

(71) Applicant: Neal A Hammond, Phoenix, AZ (US)

(72) Inventor: Neal A Hammond, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,323

(22) Filed: Dec. 19, 2023

Related U.S. Application Data (63) Continuation of application No. 16/751,368, filed on Jan. 24, 2020, now Pat. No. 11,849,749.

(60) Provisional application No. 62/799,266, filed on Jan. 31, 2019.

(51) Int. Cl.
| | | |
|---|---|---|
| *A23L 7/104* | (2016.01) | |
| *A23C 11/10* | (2021.01) | |
| *A23L 5/20* | (2016.01) | |
| *A23L 7/10* | (2016.01) | |
| *A23L 15/00* | (2016.01) | |
| *B01D 61/02* | (2006.01) | |
| *B01D 61/14* | (2006.01) | |
| *B01D 61/46* | (2006.01) | |
| *B01D 61/58* | (2006.01) | |
| *B01D 69/02* | (2006.01) | |
| *C02F 1/44* | (2023.01) | |
| *C02F 103/26* | (2006.01) | |
| *C02F 103/32* | (2006.01) | |

(52) U.S. Cl.
CPC .............. *A23L 7/107* (2016.08); *A23C 11/10* (2013.01); *A23L 5/20* (2016.08); *A23L 7/115* (2016.08); *A23L 15/35* (2016.08); *B01D 61/025* (2013.01); *B01D 61/145* (2013.01); *B01D 61/146* (2022.08); *B01D 61/58* (2013.01); *B01D 69/02* (2013.01); *C02F 1/444* (2013.01); *A23V 2002/00* (2013.01); *B01D 2317/025* (2013.01); *B01D 2325/20* (2013.01); *C02F 1/441* (2013.01); *C02F 1/442* (2013.01); *C02F 2103/26* (2013.01); *C02F 2103/32* (2013.01)

(58) Field of Classification Search
CPC .......... A23L 7/107; A23L 7/115; A23L 15/35; B01D 61/146; C02F 1/444
See application file for complete search history.

(56) References Cited

U.S. PATENT DOCUMENTS

2020/0138054 A1\* 5/2020 Janow ................... A23J 3/32

\* cited by examiner

*Primary Examiner* — Sikarl A Witherspoon
(74) *Attorney, Agent, or Firm* — ROY KIESEL FORD DOODY & NORTH, APLC (57) ABSTRACT

A process for treating rice bran utilizing a shear pump to circulate a solution comprising an enzyme, an acid and water with rice bran in a mixing tank, then after a first predetermined period transferring a portion of the solution to a feed tank, and then over a second predetermined period filtering the solution in the feed tank through multiple filtration units each having a pre-selected pore size to obtain pre-determined value-added by-products from the rice bran.

12 Claims, 6 Drawing Sheets

PROCESS SCHEDULE

| PILOT PROCESS | EST TIME | HOURLY PRODUCTION SCHEDULE | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| PLACE RICE BRAN IN TANK | 0.5 | ■ | | | | | | | | | | | |
| ADD WATER TO TANK | 0.5 | ■ | | | | | | | | | | | |
| ADJUST PH (pH=5.5) | 0.5 | | ■ | | | | | | | | | | |
| ADD ENZYMES TO TANK | 0.5 | | ■ | | | | | | | | | | |
| ALLOW TO SOAK | 2.0 | | | ■ | | | | | | | | | |
| ULTRAFILTRATION 1 RETENTATE TO TANK | 4.0 | | | | | ■ | | | | | | | |
| ULTRAFILTRATION 1 PERMEATE TO TANK | 3.0 | | | | | | ■ | | | | | | |
| CLEAN ULTRAFILTRATION 1 MEMBRANE | 1.0 | | | | | | | ■ | | | | | |
| ULTRAFILTRATION 2 RETENTATE TO TANK | 4.0 | | | | | | | | ■ | | | | |
| ULTRAFILTRATION 2 PERMEATE TO TANK | 3.0 | | | | | | | | | ■ | | | |
| COMBINE ULTRAFILTRATION 1 & 2 RETENTATES | 0.5 | | | | | | | | | ■ | | | |
| CLEAN ULTRAFILTRATION 2 MEMBRANE | 1.0 | | | | | | | | | ■ | | | |
| DRY ULTRAFILTRATION 1 & 2 RETENTATE | 2.5 | | | | | | | | | ■ | ■ | | |
| ULTRAFILTRATION 3 RETENTATE TO TANK | 4.0 | | | | | | | | | | ■ | | |
| ULTRAFILTRATION 3 PERMEATE TO TANK | 3.0 | | | | | | | | | | ■ | | |
| CLEAN ULTRAFILTRATION 3 MEMBRANE | 1.0 | | | | | | | | | | ■ | | |
| DRY ULTRAFILTRATION 3 RETENTATE | 2.5 | | | | | | | | | | | ■ | |
| NANOFILTRATION RETENTATE TO TANK | 4.0 | | | | | | | | | | ■ | ■ | |
| NANOFILTRATION PERMEATE TO TANK | 3.0 | | | | | | | | | | | ■ | |
| CLEAN MEMBRANE | 1.0 | | | | | | | | | | | ■ | |
| DRY NANOFILTRATION RETENTATE | 2.5 | | | | | | | | | | | | ■ |

FIGURE 6

FILTRATION METHOD FOR PRODUCING VALUE ADDED PRODUCTS FROM RICE BRAN

PRIORITY CLAIM

This application is a continuation of pending U.S. patent application Ser. No. 16/751,368 (now U.S. Pat. No. 11,849,749), which claimed benefit to Provisional Application 62/799,266, both of which are hereby incorporated by reference in their entirety.

BACKGROUND OF THE INVENTION

Field of the Invention

This invention relates in general to a process for extracting value added products from rice bran; and more particularly to a process utilizing membrane filtration to extract the value-added products having a high-fat content useful in animal feed or further processed to produce a protein product useful as a milk or egg replacer or further extracted to produce a protein isolate product or further processed to form a protein product for nutraceuticals or further processed to form low molecular weight products containing little or no heavy metals.

Prior Art

Rice grain anatomically includes: the husk, the pericarp, the aleurone and seed coat, the starchy endosperm, and the germ. Rice bran is a byproduct obtained during the production of milled rice. Typically the paddy (i.e., uncut or gathered rice in the husk) first undergoes a pre-cleaning to remove impurities such as straw, chaff, and empty grains. The husk is then removed from the pre-cleaned paddy by the use of rubber roll huskers to produce a mixture of brown rice and unhusked paddy. The unhusked paddy is recycled to the huskers, and the brown rice moves to the de-stoner to remove small stones, mud balls, and similar particles. The de-stoned, brown rice is next moved to a series of whitener treatments (abrasive whitener and friction whitener) to remove the rice bran, and the remaining de-stoned, whiten rice undergoes further milling treatments to produce the final milled rice product.

The use of rice bran as a value-added byproduct is unique from the bran of other grains such as wheat, oats, barley, and rye, in that most grain brans can be removed intact and separated using sifter or air classifiers. However, rice does not contain distinct exterior bran; therefore, to remove the bran, the bran layer needs to be ground into a powder and removed from the solid white rice kernel.

The rice bran is the hard outer layer of rice consisting of the aleurone and the pericarp. It contains an array of micronutrients like oryzanols, tocopherols, tocotrienols, phytosterols, 20% oil and 15% protein, 50% carbohydrate (mostly starch) dietary fibers like beta-glucan, pectin and gum.

The aleurone layer is part of the endosperm in which it originates. In the aleurone, two different types of cells have been identified: one around the starchy endosperm, and another around the germ. The thickness and number of layers of cells in the aleurone varies according to the variety of the grain, the region in which it is cultivated, and the conditions under which it is grown.

The aleurone granules are spherical, with a 1-3 µm diameter, and have at least two constituent parts: (1) a particle with a high phytic acid content, which is the nucleus of the protein granule, and (2) the surrounding coat, which is composed of proteins and carbohydrates.

Rice bran initially was used as animal feed and through use of solvent extraction to obtain a rice oil product. However, until recently, rice bran as a source of value-added food products was under-utilized due to a lipase enzyme which is endogenously present or produced as a result of microbial activity, which is activated during the milling process. These lipases hydrolyze the oil into glycerol and free fatty acids, which give the product a rancid smell and bitter taste that renders the bran unsuitable for consumption. Under normal milling conditions, rice bran will degrade in approximately six hours into an unpalatable material, making it unsuitable as human food. Because of the problem with rancidity, most rice bran has been used as a high protein feed additive for animals or as fertilizer or fuel.

Efforts have been made to stabilize rice bran, including cold storage, sun-drying, steaming, expelling, and use of chemical stabilizers like sodium metabisulphite. More recently use of ohmic heating, and the use of acids having antioxidative properties have been tested to obtain greater stabilization of rice bran.

It has been recognized that rice bran contains many value-added byproduct components, including proteins. Because of the location of the protein bodies in the rice bran, removing the proteins and separating them from other chemical constituents has proven difficult and up until this invention, not commercial. One method for obtaining protein from rice is the process of manufacturing rice syrup. Rice syrup is manufactured using whole, ground rice, treating it with Amylase and Amyloglucosidase enzymes to break the starches into sugar. Once the sugar is created, the only insoluble portion of the rice is the protein, which can be removed by traditional separation techniques. Because these are endosperm proteins that are insoluble in water, unlike water-soluble aleurone proteins, they have low protein quality and contain bad flavor and aroma compounds. Whenever researchers have tried to extract rice bran proteins, they begin with defatted bran. Bran is defatted, like other grains and legumes, using hexane as the extracting solvent. Hexane is an approved solvent, but it has one undesirable feature, a boiling point of 155° F. This is above the temperature for denaturing protein, and making it less soluble or less digestible. Other processes that have been tried, but have unsuccessful in separating rice bran and producing a rice bran soluble protein include air classification, filter press, hydrocyclone, centrifugation and gravity separation.

SUMMARY OF THE INVENTION

Therefore, it is an objective of this invention to provide a commercial process to obtain the soluble proteins contained in rice bran.

It is another objective of this invention to provide a process for a filtration treatment of a rice bran slurry to provide a multitude of value-added products.

It is still another objective of this invention to provide a process for a filtration treatment of rice bran slurry to produce a high-fat fiber product useful in the formulation of an animal feed.

It is still another objective of this invention to provide a process for a filtration treatment of rice bran slurry to produce a replacement product for milk or egg-containing products.

It is a further objective of this invention to provide a process for a filtration treatment of rice bran slurry to produce a mineral-rich product useful in the formulation of a nutraceutical product.

It is still further an objective of this invention to provide a process for a filtration treatment of rice bran slurry to produce a non-heavy metal, low molecular weight products containing amino acids, fatty acids, and/or sugars.

It is another objective of this invention to provide a process for a filtration treatment of rice bran slurry to produce a variety of value-added products and a discharge stream of reverse osmosis pure water.

It is another objective of this invention to provide a process for separation of various constituents found in rice bran based on the molecular weight of the constituent, and not on solubility, or other factors.

It is still another objective of this invention to provide a process for separation of various constituents found in rice bran without changing the constituents by adding chemicals.

It is still another objective of this invention to provide a process for separation of various constituents found in rice bran whereby any chemical modification of the constituents can be reversed by mechanical means.

It is still another objective of this invention to provide a process for separation of various constituents found in rice bran that permits the removal of heavy metals, including arsenic, and other unwanted contaminants based on the molecular weight of the contaminants.

It is still another objective of this invention to provide a process for separation of various constituents found in rice bran that permits the addition use of diafiltration water to either the permeate or the concentrate or returned back to the feed for further processing.

Other advantages and objectives of the invention are inherent or obvious to a person of ordinary skill in the art from the ensuing descriptions of the invention.

Accordingly, the above-described objectives of the invention may be achieved by first mixing the rice bran with water and sufficient acid to produce a slurry having a pH of about 5.5, and then adding enzymes to facilitate breaking down the rice bran. This slurry is then circulated through a shear pump and back into the mixing tank for a predetermined period of time wherein a portion of the resultant feed stream is then sent to a feed tank. It has been found that the ratio of water to the rice bran at this initial stage of the process, as well as during diafiltration, will favor the separation of various constituents. Approximately 90 constituents have been identified in rice bran, all of which it has been found can be separated, isolated, and removed using ratios of water to solids and modifying the ultrafiltration parameters, such as membrane size, permeation and concentration rates, pressure and flow rates, and temperature rates.

Although the constituents found in rice bran can vary depending on the rice variety and other known factors, white rice bran would typically comprise appropriately by weight 13% protein, 18% fat, 55% carbohydrates, and 14% minerals. The percentages of these compositions in the feed stream can vary depending upon the type of bran, whether full-fat rice bran or defatted bran which has undergone oil extraction, size of the bran particle (between 1 micron and 1,000 microns), the ratio of fats (triglycerides) to fatty acids (monoglycerides), the pH of the native bran (between 5.5 and 7.5 pH without chemical modification), the ratio of major constituents such as size of carbohydrates, proteins, fats, minerals, and water, as they relate to each other within the rice bran particle. Using this white rice bran, for each 1,000 pounds of rice bran processed per hour, the rice bran slurry being processed per hour would initially contain about 5500 pounds water, about 130 pounds protein, about 180 pounds fat, about 300 pounds carbohydrates, about 140 pounds minerals, 7 pounds enzymes, and 13 pounds of acid. After a period of mixing the rice bran slurry, it is then pumped at a predetermined rate into a 500,000 MWCO ultrafilter being subjected to diafiltration, preferably by use of 20,000 pounds/hour water mixed with the rice bran slurry, to facilitate the rice bran slurry and additional water passing through the ultrafilter. It is preferred, before diafiltration, a nutritional analysis of the bran is performed, and the amount of water added during the process is varied depending on the relative amount of constituents present and their relative ratios to each other. The retentate from the 500,000 MWCO ultrafilter is subjected to drying to produce a high-fat fiber product useful in animal feeds formulations or other formulations needing higher fiber content. It has been found that the type of dryer to be used during the drying step is changed depending on the particle size of the bran, and the sensitivity of protein and other constituents to heat. The permeate from the 500,000 MWCO ultrafilter includes most of the diafiltration water in the feed stream. The amount included in the permeate is influenced by the unmodified carbohydrates which have their own water holding capacity (WHC), which affects whether the constituents will pass through the ultrafiltration membrane or be retained in the retentate.

The permeate is then processed through a 100,000 MWCO ultrafilter to produce a second permeate and a second retentate. The second retentate is subsequently dried to produce a product which can be utilized as an egg or milk substitute.

Traditionally, many types of centrifuges and mechanical separators are used to remove large sized materials from grains and legumes before ultrafiltration. These types of apparatus are used because the microfiltration and ultrafiltration are sensitive to blinding. The 500,000 MWCO tubular membrane was chosen because the stream is not affected by blinding, but can make separations regardless of particle size. However, particle size must still be kept in mind while changing the water/solids ratio and the degree of milling of the rice, which will affect the particle size and the relative compositing of the bran.

The second permeate is the passed to a 30,000 MWCO ultrafilter to produce a third permeate and a third retentate which when subsequently dried produces a rice bran protein isolate (90+% protein content) product useful for any number of food products desiring added protein that has not been denatured. Such protein is more sensitive to the heat of drying than the other constituents in the bran. Drying the protein requires more gently drying conditions, such as spray drying, freeze-drying, or flash drying.

The third permeate is then passed through a 1,000 MWCO nanofilter to produce a fourth permeate and a fourth retentate, which, when subsequently dried, produces a mineral-rich stream useful in the formulation of nutraceutical products. The fourth permeate, which is now substantially free of heavy metals, such as arsenic, is then passed through a 100 MWCO reverse osmosis filter wherein additional heavy metals can be removed to form substantially pure water permeate that can be directly discharged in a stream or other public body of water. The heavy metals can be removed during the nanofiltration and reverse osmosis steps by choosing membrane molecular weight sizes varying between 1,000 and 5,000 MWCO for the nanofilter membrane, and 100 to 500 MWCO for reverse osmosis membrane. The heavy metals present in the slurry are heavier than the minerals, like iron, copper, and zinc, and can be separated at different molecular weight membranes. A fifth retentate is also obtained containing desirable low molecular weight products, including amino acids and fatty acids, sugars, and which are heavy metal-free.

PREFERRED EMBODIMENTS OF THE INVENTION

A typical rice bran comprising about 13% proteins by weight, about 18% fat by weight, about 25% by weight carbohydrates and about 14% by weight minerals can be used to form a slurry 1A by adding enzymes, acid and water having the following weight content ratios: about 7 pounds of enzyme:about 13 pounds of acid:about 1000 pounds of rice bran:about 5,500 pounds of water.

Figure 1:
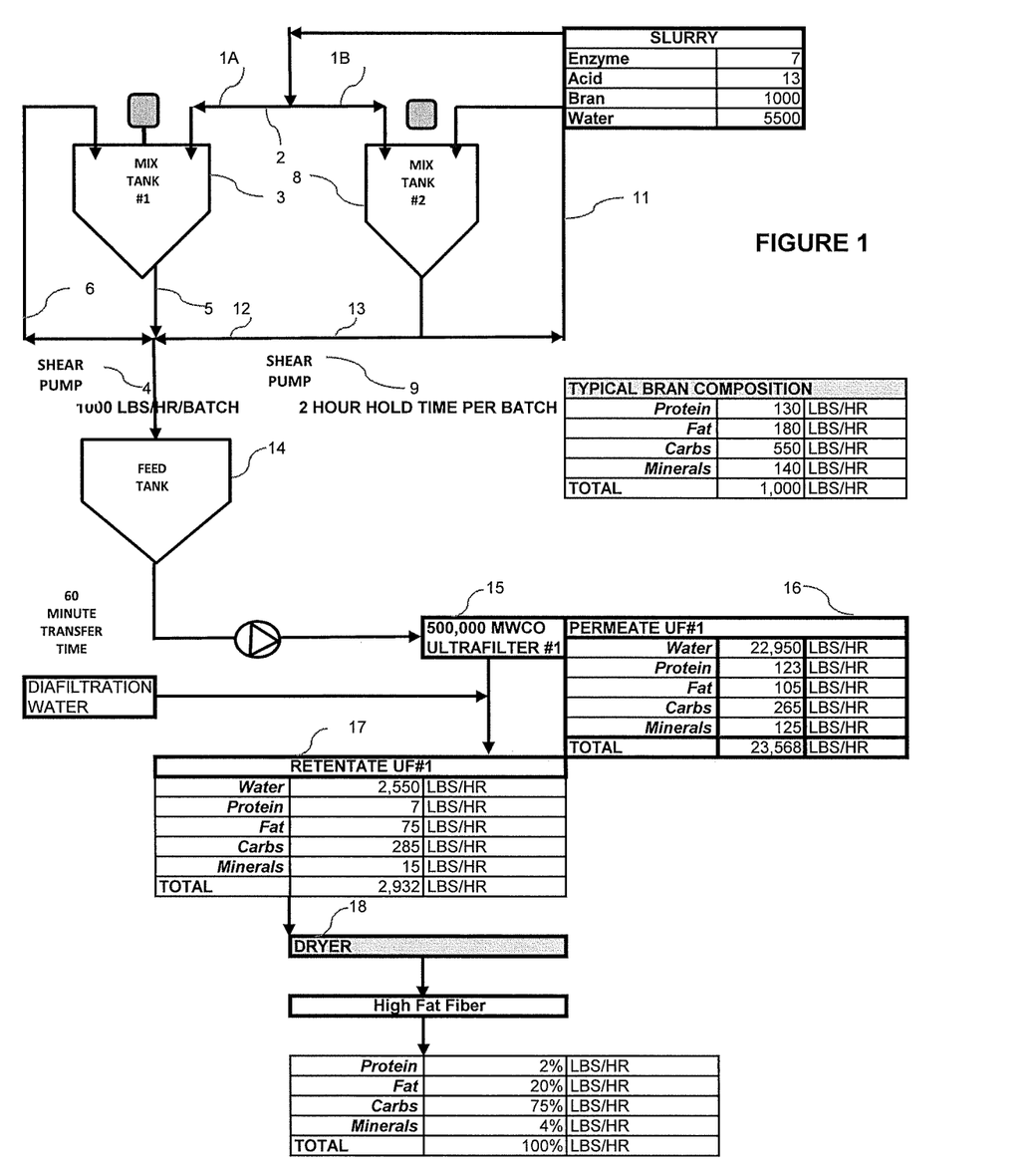
FIG. 1 is a flow diagram illustrating the process steps of the invention utilizing a 500,000 MWCO ultrafilter to produce a high-fat fiber product useful in human or animal feed.

As illustrated in FIG. 1, slurry 1A is then introduced through line 2 into a first mixing tank 3 and is mixed utilizing shear pump 4 that draws slurry 1 through intake line 5 and then through shear pump 4, and then into outflow line 6 to circulate slurry 1 back to tank 2. This circulation of slurry 1A is continued for a predetermined time to achieve a uniform acid level of about a pH level of 5.5 in the mixture, as well as better ensure the enzymes have been uniformly mixed in slurry 1A. This formation and circulation of slurry 1A preferably takes about four hours. If desired second similar slurry 1B can be introduced through line 7 into a second mixing tank 8. Then as with first slurry 1, a shear pump 9 draws slurry 1B through intake line 10 into shear pump 9 and into outflow line 11 to circulate slurry 1B back to tank 2. This formation and circulation of slurry 1B preferably also takes about four hours. If desired the circulation of slurry 1A and slurry 1B can be done simultaneously. After slurry 1A and slurry, 1B have completed their circulation cycle, the flow control valves (not shown) of shear pumps 4 and 9 can be activated to direct slurry flow from mix tanks 3 and 8 through lines 12 and 13, respectively, and into feed tank 14.

The slurries 1A and 1B are then feed through the first ultrafiltration unit 15. It is preferred that unit 15 be a 500,000 MWCO unit. To ensure that slurries 1A and 1B do not blind unit 15 as they pass through unit 15, it is preferred that an appropriate amount of diafiltration water be combined with the slurries 1A and 1B before the combination is passed through the ultrafilter. The amount of diafiltration water needed to prevent blinding of unit 15 is about 20,000 pounds/hour.

This first phase of the process results in a first permeate stream 16 passing through the ultrafilter and a first retentate stream 17 that does not pass through the ultrafilter unit 15. The composition of these two streams is set forth in Chart 1 below.

| CHART 1-FIRST FILTRATION COMPOSITION MAKEUP | | |
|---|---|---|
| CONSTITUENTS | FIRST PERMEATE STREAM | FIRST RETENTATE STREAM |
| WATER | 22,950 #/hour | 2,550 #/hour |
| PROTEIN | 123 #/hour | 7 #/hour |
| FATS | 105 #/hour | 75 #/hour |
| CARBOHYDRATES | 265 #/hour | 285 #/hour |
| MINERALS | 125 #/hour | 15 #/hour |
| TOTAL | 23,568 #/hour | 2,932 #/hour |

The first retentate stream 17 is then transferred to a dryer 18 to remove the water from the stream 17. The resulting dried stream 19 is a high-fat fiber product that can be used as animal feed.

Figure 2:
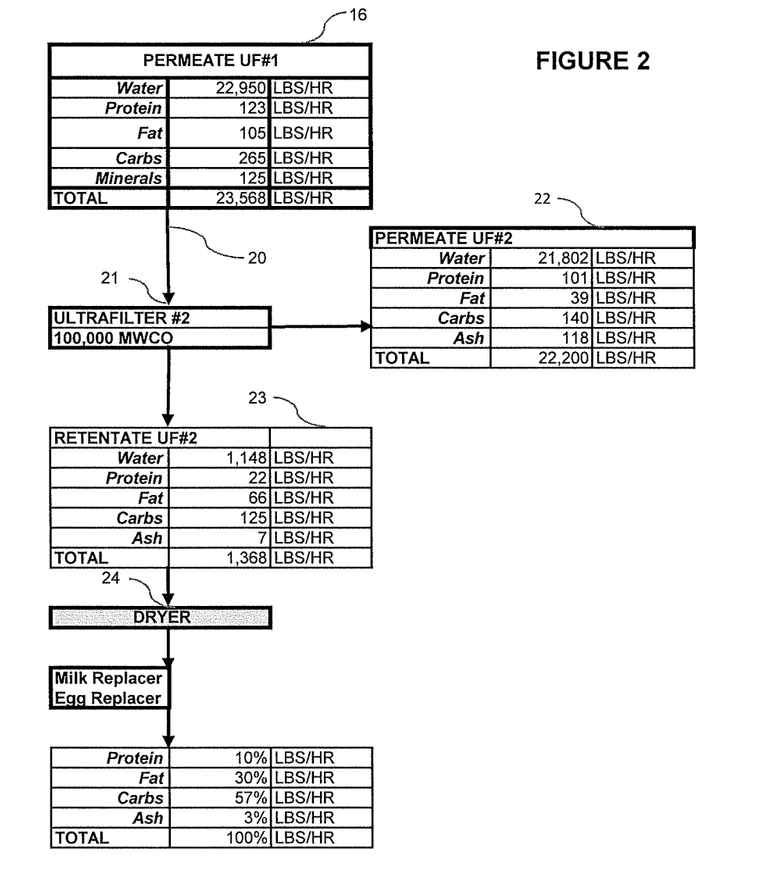
FIG. 2 is a preferred flow diagram utilizing a 100,000 MWCO ultrafilter to produce milk or egg replacer product from the permeate from the 500,000 MWCO ultrafilter in FIG. 1.

Turning now to FIG. 2, the first permeate stream 16 is transferred by line 20 to ultrafilter unit 21. Unit 21 is preferably a 100,000 MWCO ultrafilter. Because of the size selection of the ultrafilter units, it is not necessary to add any additional diafiltration water. This second filtration process step results in a second permeate stream 22 and a second retentate stream 23. The composition of these two streams is set forth in Chart 2.

| CHART 2-SECOND FILTRATION COMPOSITION MAKEUP | | |
|---|---|---|
| CONSTITUENTS | SECOND PERMEATE STREAM | SECOND RETENTATE STREAM |
| WATER | 21,802 #/hour | 1,148 #/hour |
| PROTEIN | 101 #/hour | 22 #/hour |
| FATS | 39 #/hour | 66 #/hour |
| CARBOHYDRATES | 140 #/hour | 125 #/hour |
| MINERALS | 116 #/hour | 7 #/hour |
| TOTAL | 22,200 #/hour | 1,368 #/hour |

The second retentate stream 23 is then transferred to a dryer 24 to remove the water from the stream 23. The resulting dried stream 25 can serve as a milk or egg replacement product.

Figure 3:
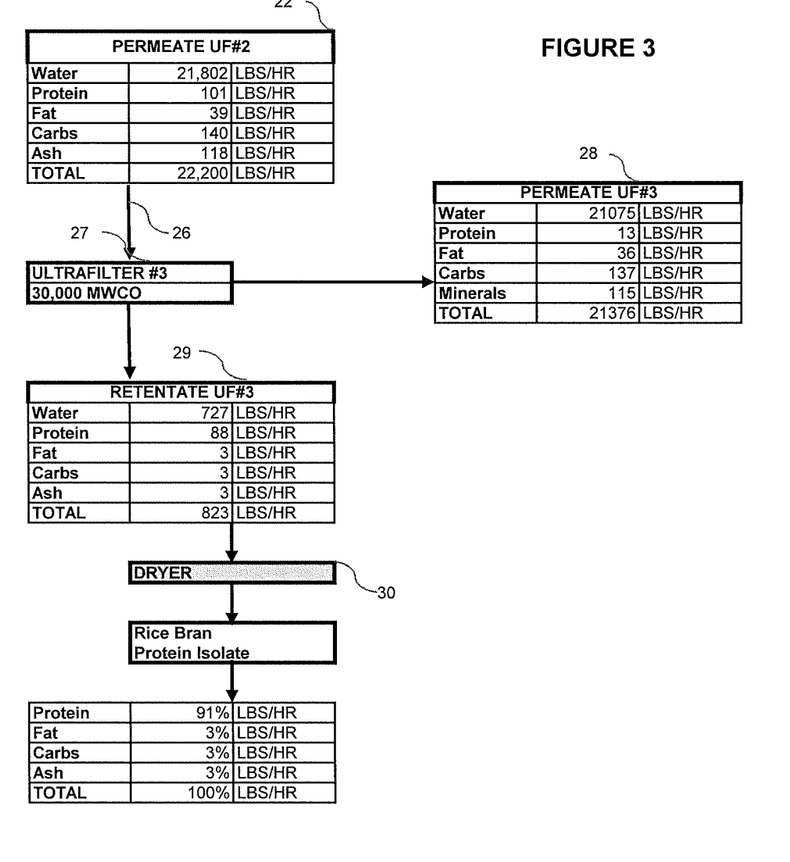
FIG. 3 is a preferred flow diagram utilizing a 30,000 MWCO ultrafilter to produce a rice bran protein isolate product from the permeate from the 100,000 MWCO ultrafilter in FIG. 2.

Referring now to FIG. 3, the second permeate stream 22 is transferred inline 26 to ultrafilter unit 27. Unit 27 is preferably a 30,000 MWCO ultrafilter. Again because of the initial amount of diafiltration water, it is not necessary to add additional diafiltration water to the second permeate stream 22. This third filtration process step results in a third permeate stream 28 and a third retentate stream 29. The composition of these two streams is set forth in Chart 3.

CHART 3-THIRD FILTRATION COMPOSITION MAKEUP

| CONSTITUENTS | THIRD PERMEATE STREAM | THIRD RETENTATE STREAM |
|---|---|---|
| WATER | 21,075 #/hour | 727 #/hour |
| PROTEIN | 13 #/hour | 88 #/hour |
| FATS | 36 #/hour | 3 #/hour |
| CARBOHYDRATES | 137 #/hour | 3 #/hour |
| MINERALS | 115 #/hour | 3 #/hour |
| TOTAL | 21,376 #/hour | 823 #/hour |

The third retentate stream 29 is then transferred to a dryer 30 to remove the water from the stream 29. The resulting dried stream 29 can serve as a rice bran protein isolate.

Figure 4:
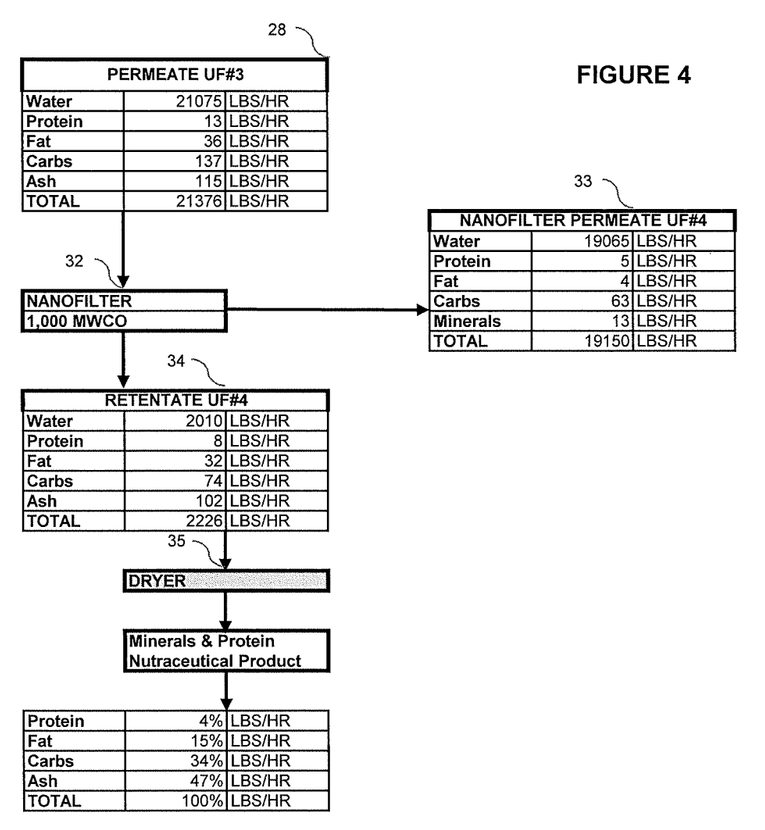
FIG. 4 is a preferred flow diagram utilizing a 1,000 MWCO nanofilter to produce a nutraceutical product from the permeate from the 30,000 MWCO ultrafilter in FIG. 3.

Referring now to FIG. 4, the third permeate stream is transferred inline 31 to a nanofilter unit 32. Unit 32 is preferably a 1,000 MWCO nanofilter. Again because of the initial amount of diafiltration water, it is not necessary to add additional diafiltration water to the third permeate stream 31. This fourth filtration process step results in a fourth permeate stream 33 and a fourth retentate stream 34. The composition of these two streams is set forth in Chart 4 below.

CHART 4-FOURTH FILTRATION COMPOSITION MAKEUP

| CONSTITUENTS | FOURTH PERMEATE STREAM | FOURTH RETENTATE STREAM |
|---|---|---|
| WATER | 19,065 #/hour | 2,010 #/hour |
| PROTEIN | 5 #/hour | 8 #/hour |
| FATS | 4 #/hour | 32 #/hour |
| CARBOHYDRATES | 63 #/hour | 74 #/hour |
| MINERALS | 13 #/hour | 102 #/hour |
| TOTAL | 19,150 #/hour | 2,226 #/hour |

The fourth retentate stream 33 is then transferred to a dryer 35 to remove the water from the stream 33. The resulting dried stream 36 can serve as neutraceutical product.

Figure 5:
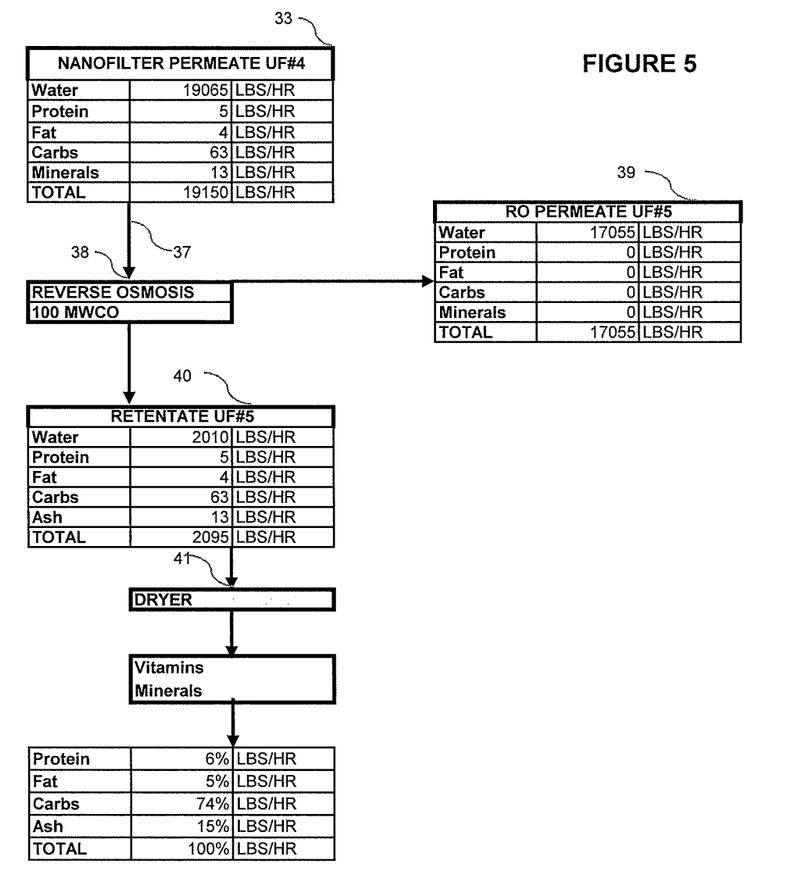
FIG. 5 is a preferred flow diagram utilizing a 100 MWCO reverse osmosis filter to produce non-heavy metal, low molecular weight products such as amino acids, fatty acids and sugars, and a permeate of reverse osmosis pure water from the permeate from the 1,000 MWCO nanofilter in FIG. 4.

Turning now to FIG. 5, the fourth permeate stream 34 is transferred inline 37 to a reverse osmosis unit 38. Unit 38 is preferably a 100 MWCO reverse osmosis filter. Again because of the initial amount of diafiltration water, it is not necessary to add additional diafiltration water to the fourth permeate stream 34. This fifth filtration process step results in a fifth permeate stream 39 of purified water that can then be dumped in a stream or other water body without further filtering or other treatment. A fifth retentate stream 40 is also formed. The composition of these two streams is set forth in Chart 5.

CHART 5-FIFTH FILTRATION COMPOSITION MAKEUP

| CONSTITUENTS | FIFTH PERMEATE STREAM | FIFTH RETENTATE STREAM |
|---|---|---|
| WATER | 17,055 #/hour | 2010 #/hour |
| PROTEIN (AMINO & FATTY ACID) | 0 #/hour | 5 #/hour |
| FATS (SUGARS) | 0 #/hour | 4 #/hour |
| CARBOHYDRATES | 0 #/hour | 63 #/hour |
| MINERALS | 0 #/hour | 13 #/hour |
| TOTAL | 17,055 #/hour | 2,095 #/hour |

The fifth retentate stream 40 can be used as low molecular weight products.

Figure 6:
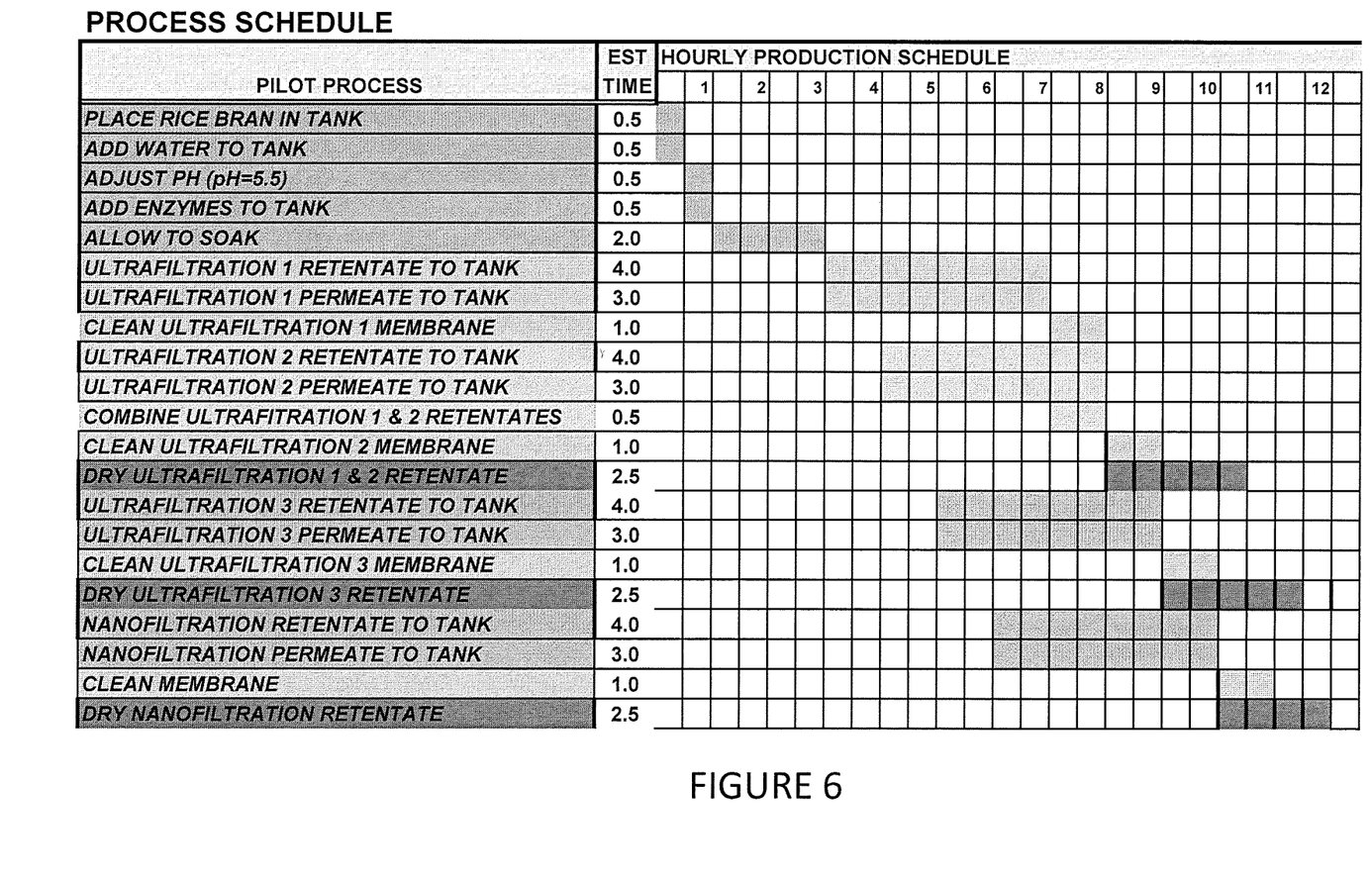
FIG. 6 is a process time schedule of the products through the various steps of a preferred process embodiment, as illustrated in FIGS. 1-5.

Referring to FIG. 6, the time to take each step in the process is set forth, including cleaning the filters to receive the next batch of rice bran slurry.

Although the present invention and its advantages have been described in detail, it should be understood that various changes, substitutions, and alterations can be made therein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will appreciate from the disclosure of the present invention, processes, machines, manufacture, compositions of matter, means, methods, or steps, presently existing or later to be developed that perform substantially the same function or achieve substantially the same result as the corresponding embodiments described herein maybe utilized according to the present invention. Accordingly, the appended claims are intended to include within their scope such processes, machines, manufacture, compositions of matter, means, methods, or steps.

I claim:

1. A process for extracting a value-added product from rice bran comprising:
    a. Circulating a solution comprising an enzyme, an acid, water, and rice bran in a tank;
    b. after a first predetermined period, filtering the solution over a second predetermined period to produce a permeate stream and a retentate stream; and
    c. drying the permeate stream to remove substantially all of the water in the permeate stream to produce a high-fat fiber value-added product.

2. The process according to claim 1 wherein the filtering step is performed using an MWCO filter.

3. The process according to claim 2 wherein the MWCO filter is selected from the group consisting of 500,000; 100,000; 30,000; 1000; and 100 MWCO filters.

4. The process according to claim 1 further comprising filtering the solution a plurality of times to create a plurality of permeate streams.

5. The process according to claim 4 wherein the plurality of filtering steps are performed using a plurality of MWCO filters.

6. The process according to claim 5 wherein the plurality of MWCO filters are selected from the group consisting of 500,000; 100,000; 30,000; 1000; and 100 MWCO filters.

7. The process according to claim 5 wherein each of the plurality of MWCO filters used in the plurality of filtering steps have a different molecular weight cut-off.

8. The process of claim 1 wherein the solution is comprised of about 0.1% by weight enzyme; about 0.2% by weight acid; about 15.3% by weight rice bran; and about 84.4% by weight of water.

9. The process of claim 8 wherein the enzyme is selected from the group consisting of amylase, amyloglucosidase, pentosanase, hexosanase, or and combinations thereof.

10. The process of claim 8 wherein the acid is selected from the group consisting of organic acids and mineral acids and wherein the solution has a pH range of 4.0 to 9.0.

11. The process of claim 1, wherein the first predetermined period is about 1.5-4.0 hours.

12. The process of claim 1, wherein the second predetermined period is about 0.5-1.5 hours.

* * * * *